United States Patent
Taylor et al.

[15] 3,643,747
[45] Feb. 22, 1972

[54] FAIRWAY TOOL BAR CUTTER

[72] Inventors: Miller Taylor; Dewey R. Davis, both of Box 518, Elizabethtown, N.C. 28337

[22] Filed: Dec. 5, 1969

[21] Appl. No.: 882,797

[52] U.S. Cl..............................172/657, 172/700, 172/713, 172/766, 306/1.5
[51] Int. Cl...................................A01b 23/04, A01b 45/02
[58] Field of Search.................172/451, 484, 506, 439, 449, 172/693, 620, 652, 658, 661, 662, 683, 693, 694, 705, 706, 657, 713, 753, 777, 744, 766; 306/1.5; 287/54.1; 52/729; 56/400.01, 400.25

[56] References Cited

UNITED STATES PATENTS

| | | | |
|---|---|---|---|
| 611,655 | 10/1898 | Stone | 306/1.5 |
| 710,557 | 10/1902 | Bates | 306/1.5 |
| 2,617,346 | 11/1952 | Jeoffroy | 172/776 |
| 2,712,780 | 7/1955 | Graham | 172/657 |
| 2,897,614 | 8/1959 | Billings | 172/713 |
| 3,394,765 | 7/1968 | Davis | 172/753 |
| 3,408,803 | 11/1968 | Vanderveer | 56/400.01 |
| 3,467,199 | 9/1969 | Lowery | 172/766 |
| 3,527,308 | 9/1970 | Bernotas et al. | 172/699 |

Primary Examiner—Robert E. Pulfrey
Assistant Examiner—C. W. Hanor
Attorney—Sughrue, Rothwell, Mion, Zinn & Macpeak

[57] ABSTRACT

A tool bar cutter is formed by an I-beam crossmember having spaced-apart parallel apertures through the center portion of the I-beam member in which apertures are adjustably mounted a plurality of cutter blades.

5 Claims, 4 Drawing Figures

PATENTED FEB 22 1972  3,643,747

INVENTORS
MILLER TAYLOR
DEWEY R. DAVIS

BY Sughrue, Rothwell, Mion, Zinn & Macpeak
ATTORNEYS

FAIRWAY TOOL BAR CUTTER

BACKGROUND OF THE INVENTION

1. Field of the Invention

This invention relates to an apparatus for working soil, turf and the like, and particularly to improvements in apparatus for aerating the turf of golf courses, bowling greens, lawns and the like. As is known, it is beneficial to cut through root growth and perforate the turf periodically to aerate and facilitate the penetration of fertilizers and water. This is particularly important in areas where the quality of the turf must remain high such as on golf course fairways and the like.

2. Description of the Prior Art

Devices for aerating soil are known. These devices usually incorporate a plurality of cutter blades which are supported on wheels and pushed by hand. In other devices the cutter blades are mounted on a shaft which is driven by means of an internal combustion engine. These devices of the prior art have worked satisfactorily if the area to be aerated is relatively small and the turf or sod is not to be cut to a very great depth. However, in the case of golf courses and the like where the amount of turf to be aerated is great the small devices of the prior art are totally inadequate both from the standpoint of the time which would be required to completely aerate an 18-hole golf course as well as the considerably greater depth of the cut which has been found necessary to properly aerate great expanses of turf of this nature. In addition, the blades of the aerating devices of the prior art were usually constructed of such a nature that in the event a blade engages a stone or rock beneath the turf, the stone or rock either bends the blade so as to render it useless or the blade forces the stone from the ground thus damaging the turf.

SUMMARY OF THE INVENTION

This invention provides a tool bar cutter for aerating large expanses of turf such as those found on golf courses and the like in a fast and efficient manner while at the same time cutting the turf to a considerably greater depth than that capable by presently known devices and greatly reducing possible damage to the cutter blades or turf in the event a stone or other obstacle is encountered.

The invention preferably comprises an I-beam which is approximately 10 feet in length and which has spaced-apart parallel apertures slightly wider than the width of the cutter blades and located through the center portion of the I-beam and perpendicular to the flat side portions thereof. The cutter blades are approximately 12 inches long and 6 inches wide. The cutting edge can either be straight or have an end portion which is slightly curved. The blades are held in the apertures in the I-beam by means of spaced-apart members which are welded above and below the center portion of the I-beam. The top members are drawn together by means of bolts and thereby frictionally hold the blade in position. A three-point hitch is also secured to the I-beam to enable the tool bar cutter to be attached to a tractor or other power driven device.

If a stone or rock is encountered by the cutter blade beneath the turf the blade either pushes the stone to one side or in the case of a large rock, the blade is of sufficient strength to merely ride over the rock and not be bent or broken by it. The upturned end portion of the cutter blade also facilitates movement of the cutter blade over large rocks if they are encountered.

DESCRIPTION OF THE PREFERRED EMBODIMENT

Figure 1:
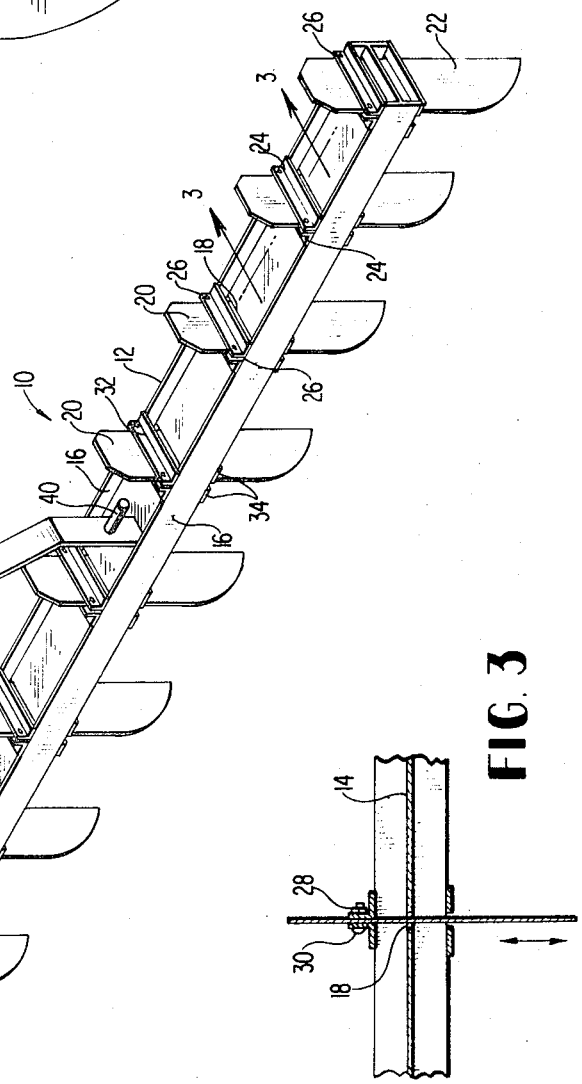
FIG. 1 is a perspective view showing the tool bar cutter of the invention.

Referring to the drawings, in FIG. 1, the tool bar cutter 10 comprises an I-beam 12 having a center portion 14 and end portions 16 perpendicular to the longitudinal edges of the center portion 14 and formed integral therewith. A center portion 14 has spaced-apart parallel apertures 18 which are perpendicular to the end portions 16.

Figure 2:
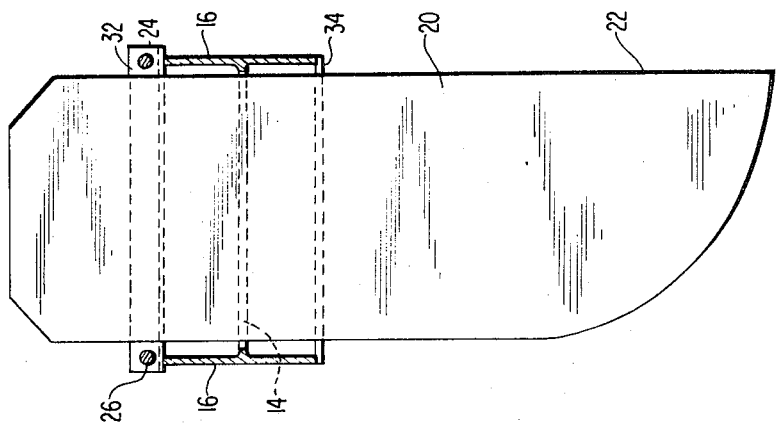
FIG. 2 is a sectional view of the tool bar cutter of FIG. 1 taken along the line 2—2.
Figure 3:
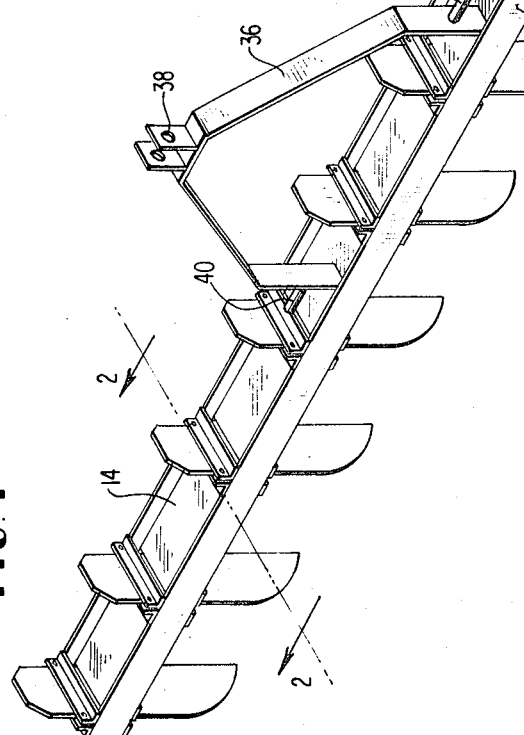
FIG. 3 is a sectional view of the tool bar cutter of FIG. 1 taken along the line 3—3.

A cutter blade 20, which can best be seen by referring to FIG. 2, is positioned in the apertures 18 with the cutting edge 22 facing in the direction of which the tool bar cutter 10 is to be pulled. The cutter blades 20 are maintained in a position perpendicular to the center portion 14 by means of spaced-apart parallel L-shaped members 24 which are welded to the top longitudinal edges of the end portions 16. The L-shaped members 24 have apertures 26 in which a nut 28 and bolt 30 are positioned as can best be seen in FIG. 3. When the nut 28 and bolt 30 are drawn towards each other the portions 32 of the L-shaped members 24 are also drawn together to thereby frictionally engage the cutter blade 20 to hold the cutter blade 20 against movement relative to the I-beam 12. Thus, by merely tightening the nut 28 and bolt 30 to the cutter blade 20 can be held at any position relative to the I-beam 12.

Additional spaced-apart flat metal members 34 are welded to the longitudinal bottom edges of the end portions 16 directly below the L-shaped members 24 to give the blade 20 stability and help maintain it perpendicular to the center portion 14 of the I-beam 12. A hitch 36 is welded or otherwise suitably secured to the center portion 14 to enable the cutter bar 10 to be attached to a tractor or other suitable power driven device. The hitch 36 has apertures 38 and projections 40 to aid in attaching the cutter bar 10 to the pulling device.

Figure 4:
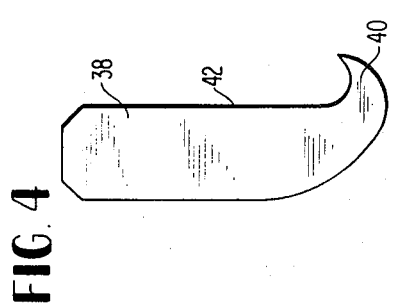
FIG. 4 shows a modified form of the cutter blade used in the tool bar cutter of the invention.

FIG. 4 shows a modified cutter blade 38 which can be used in the cutter bar 10 and which cutter blade 38 has an upturned end portion 40 and cutting edge 42 which upturned end 40 facilitates movement of the cutter blade 38 and thus the entire tool bar cutter over rocks and other obstructions which may be encountered in its path.

This invention therefore provides a tool bar cutter having a plurality of spaced-apart cutter blades which can easily be attached to a tractor or other power driven device which is relatively inexpensive to manufacture and which can aerate large expanses of turf in a minimal amount of time without damaging the turf.

What we claim is:

1. A tool bar cutter for golf course fairways and the like comprising:
    an I-shaped crossmember having a horizontally disposed center portion and a pair of vertically disposed side portions, said center portion having a plurality of apertures therethrough, a vertically disposed cutter blade located in each of said apertures, means on said I-shaped crossmember for adjustably securing each of said cutter blades in said apertures, and means secured to said I-shaped crossmember for attaching said I-shaped crossmember to a pulling device.

2. A tool bar cutter as set forth in claim 1 wherein said means for adjustably securing each of said cutter blades to said I-shaped member comprises two spaced-apart oppositely disposed L-shaped members secured to one edge of the side portions of said I-shaped member with the space therebetween aligned with said aperture, said L-shaped members having bolts through the end portions thereof for drawing said L-shaped members together to clamp said cutter blade against movement relative to said I-shaped member.

3. A tool bar cutter as set forth in claim 2 wherein two spaced-apart flat members are secured to the other edge of the side portions of said I-shaped member adjacent each aperture with the space therebetween aligned with said aperture to prevent lateral movement of the cutter blade located in said aperture with respect to said I-shaped member.

4. A tool bar cutter as set forth in claim 1 wherein said cutter blade has a straight cutting edge.

5. A tool bar cutter as set forth in claim 1 wherein said cutter blade has an upturned end portion to facilitate movement of said cutter blade over hard obstacles engaged by said cutter blade.

* * * * *